United States Patent
Takahashi et al.

(10) Patent No.: US 6,776,534 B2
(45) Date of Patent: Aug. 17, 2004

(54) OPTICAL ATTENUATOR

(75) Inventors: Mitsuo Takahashi, Matsudo (JP); Tsuguo Sato, Soka (JP)

(73) Assignee: Seikoh Giken Co., Ltd., Matsudo (JP)

( * ) Notice: Subject to any disclaimer, the term of this patent is extended or adjusted under 35 U.S.C. 154(b) by 357 days.

(21) Appl. No.: 10/059,397

(22) Filed: Jan. 31, 2002

(65) Prior Publication Data

US 2002/0106180 A1 Aug. 8, 2002

(30) Foreign Application Priority Data

Feb. 6, 2001 (JP) ........................................ 2001-029292

(51) Int. Cl.⁷ ................................................. G02B 6/36
(52) U.S. Cl. ......................... 385/76; 385/80; 385/140; 385/137
(58) Field of Search ........................... 385/76, 80, 140, 385/137

(56) References Cited

U.S. PATENT DOCUMENTS

| 4,212,514 A | 7/1980 | Prunier et al. |
| 4,884,859 A | 12/1989 | Yamamoto et al. |
| 5,581,649 A | 12/1996 | Paquette et al. |
| 5,742,725 A | 4/1998 | Longobardi et al. |

FOREIGN PATENT DOCUMENTS

| EP | 0 764 859 A1 | 3/1997 |
| WO | WO 99/44085 A1 | 9/1999 |

*Primary Examiner*—Frank G. Font
*Assistant Examiner*—Kevin C Kianni
(74) *Attorney, Agent, or Firm*—Venable LLP; Michael A. Sartori; Chad C. Anderson

(57) ABSTRACT

An optical attenuator includes a holding sleeve, a pair of ferrules inserted into and fixed to the holding sleeve such that the ferrules oppose each other at base ends thereof at a predetermined distance between each base end, and an attenuating fiber inserted into and fixed to the pair of ferrules such that ends of the attenuating fiber are exposed. The optical attenuator is also provided with an opening in the holding sleeve so as to communicate with the outside. A filler is supplied into the sleeve through the opening.

4 Claims, 3 Drawing Sheets

(PRIOR ART)

FIG. 5

| Test items | Test conditions | Criteria | 1st Embodiment | 2nd Embodiment | 3rd Embodiment |
|---|---|---|---|---|---|
| Environmental characteristics | | 1 to 10 dB | | | |
| Hot shelving | at 85°C for 240 hours | ≤ ±0.5 dB | A | A | A |
| Cold shelving | at -40°C for 240 hours | ≤ ±0.5 dB | A | A | A |
| Shelving in humidity | at 90% at 40°C for 240 hours | ≤ ±0.5 dB | A | A | A |
| Shelving in humidity at temperature varying in a range | -10°C to 60°C | ≤ ±0.5 dB | A | A | A |
| Humidity cycle test | 14 cycles each at humidity varying from 0% to 90% | ≤ ±0.5 dB | A | A | A |
| Heat cycle test | 21 cycles each at temperature varying from -40°C to 85°C | ≤ ±0.5 dB | A | A | A |
| Mechanical characteristics | | no disconnection | A | A | A |
| Fall down test | 5 cycles each in 3 directions from 1.8-meter high, 8 times in each direction | no disconnection | B (2/20 unsatisfactory) | A | C (20/20 unsatisfactory) |
| Vibration test | 20 cycles each at frequency varying from 10 to 50 Hz (Amplitude: 1.52 mm) | | A | A | B (2/20 unsatisfactory) |

OPTICAL ATTENUATOR

BACKGROUND OF THE INVENTION

1. Field of the Invention

The present invention relates to fixed optical attenuators used in communication systems using optical fibers. In particular, the present invention relates to an optical attenuator including an attenuating fiber provided with an optical attenuation function.

2. Description of the Related Art

Various types of attenuating fiber assembly have been proposed. The attenuating fiber assemblies are disclosed in, for example, Japanese Unexamined Patent Application Publication No. 9-61632 and Japanese Patent Application No. 2000-194443 by the same applicant of the present invention, in which a desired attenuation can be obtained at high accuracy.

In order to describe problems which are solved by the present invention, a known typical optical attenuator is briefly described with reference to FIG. 6 which shows a ferrule assembly including an attenuating fiber. The ferrule assembly including an attenuating fiber shown in FIG. 6 can be used in a fixed optical attenuator for FC-type, SC-type, MU-type, or LC™-type connector. A ferrule 1 shown in FIG. 6 is provided with a central hole 2 for receiving an attenuating fiber 3. The attenuating fiber 3 is inserted into the central hole 2 and is affixed by an adhesive. The ferrule 1 is mirror-finished at end faces 4 and 5 thereof by polishing after the attenuating fiber 3 is fixed to the ferrule 1.

The ferrule 1 fixed to an optical fiber is inserted into a through-hole 7 of a holding sleeve 6 either before or after the ferrule 1 is polished. The shape of the holding sleeve 6 may be modified according to the use of the optical attenuator. A flange 6a shown in FIG. 6 may be omitted.

The known optical attenuator which is used for various types of connector, as described above, has a problem regarding the length of the ferrule. Ordinary ferrules which are presently widely used each have an outer diameter d of 2.5 mm and a length $L_c$ of 10.5 mm. However, a significantly longer ferrule is used in a fixed optical attenuator for the FC-type, SC-type, or MU-type optical connector. For example, in the fixed optical attenuators for the FC-type and SC-type connector, the ferrules each having a length of 23 mm are used by reason of the configuration. Generally, the ferrules for the MU-type connector each have the outer diameter d of 1.25 mm and the length $L_c$ of 7 mm. However, the length of the ferrule used in an optical attenuator for the MU-type connector must be significantly larger, such as a length L of approximately 15 mm.

Such ferrules are manufactured generally with a zirconia ceramic either by extrusion or by molding. Even by other method, the length of the ferrules for the optical attenuators is more than twice as long as the length of the ferrules for the ordinal connectors. Therefore, it is difficult to manufacture the ferrules for the optical attenuators each in highly accurate sizes and in a stable manner in large quantities. As a result, there is a risk in that the supply quantity of the ferrules is limited, thereby increasing manufacturing costs.

SUMMARY OF THE INVENTION

Accordingly, it is an object of the present invention to provide an optical attenuator arranged so that the problems found in the known optical attenuator described above can be solved.

It is another object of the present invention to provide an optical attenuator enabled to be manufactured at low costs by using ferrules having relatively short axes which can be manufactured in a stable manner in large quantities.

In order to achieve the above objects, an optical attenuator according to the present invention includes a holding sleeve; a pair of ferrules inserted into and fixed to the holding sleeve such that the ferrules oppose each other at base ends thereof at a predetermined distance between each base end; and an attenuating fiber inserted into and fixed to the pair of ferrules such that ends of the attenuating fiber are exposed.

In the optical attenuator according to the present invention, a soft resin is provided in a space between the base ends of the ferrules.

In the optical attenuator according to the present invention, the soft resin comprises an elastic material including rubber or gel.

In the optical attenuator according to the present invention, the soft resin comprises a filler containing a light-absorptive material.

To these ends, an overall length L of the optical attenuator according to the present invention is set so as to satisfy an expression $L > L_1 + L_2$ in which $L_1$ denotes a length of one ferrule and $L_2$ denotes a length of another ferrule, the ferrules being included in the optical attenuator. The value $L - (L_1 + L_2)$ may vary, as needed.

BRIEF DESCRIPTION OF THE DRAWINGS

FIG. 5 is a table showing the comparison of the characteristics of the optical attenuator according to the first and the second embodiments and the comparative example thereof.

DESCRIPTION OF THE PREFERRED EMBODIMENTS

Figure 1:
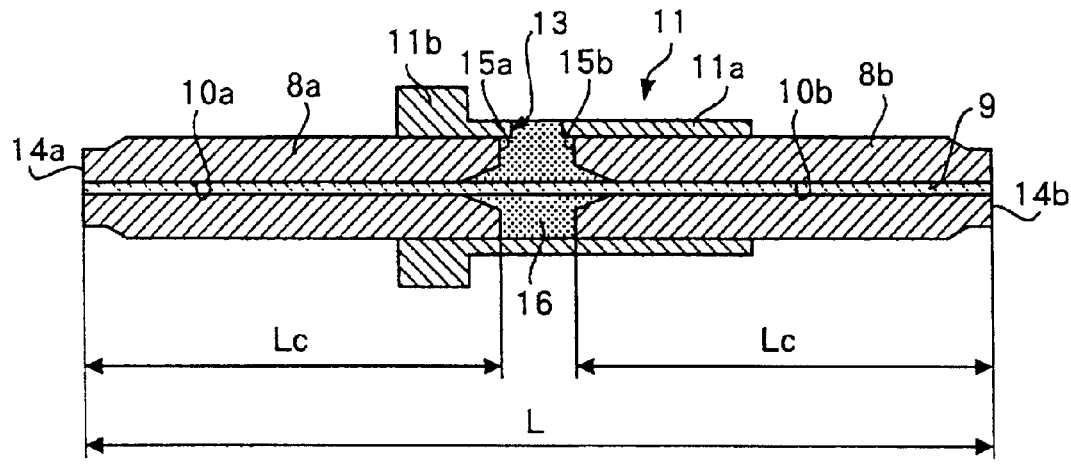
FIG. 1 is a sectional view of an optical attenuator according to the present invention.

An optical attenuator according to embodiments of the present invention is described in detail with reference to the drawings. FIG. 1 is a sectional view of an optical attenuator according to the present invention. Ferrules 8a and 8b shown in FIG. 1 and having the same shape as each other are provided with central holes 10a and 10b, respectively. Conventional ferrules each having a length $L_c$ may be used as the ferrules 8a and 8b.

When a pair of such ferrules is used, an overall length L of an assembly formed with the ferrules 8a and 8b must be set so as to satisfy an expression $L > 2L_c$. A holding sleeve 11 is provided with a through-hole 11a formed along the axis of the holding sleeve 11, the holding sleeve 11 accurately receiving the ferrules 8a and 8b at the peripheries of the ferrules 8a and 8b in the through-hole 11a. The holding sleeve 11 is provided with an opening 13 formed in a longitudinally intermediate part of the holding sleeve 11, through which a soft resin or the like is supplied. In an optical attenuator according to a second embodiment described below, the opening 13 is only used for applying an adhesive. The opening 13 may be omitted.

Manufacturing processes of the optical attenuator are briefly described below.

Firstly, the two ferrules 8a and 8b to be supported by the holding sleeve 11 are inserted into and affixed in the through-hole 11a of the holding sleeve 11 at the base parts respectively opposite to end faces 14a and 14b of the respective ferrules 8a and 8b, respectively. The end faces 14a and 14b of the ferrules 8a and 8b, respectively, coincide with the respective ends of an attenuating fiber 9 having a predetermined length. Secondly, an adhesive is applied into the central holes 10a and 10b of the ferrules 8a and 8b, respectively, thereby fixing the attenuating fiber 9 inserted into the central holes 10a and 10b to the ferrules 8a and 8b.

Thirdly, a soft filler 16 is applied between the opposing base ends of the ferrules 8a and 8b through the opening 13 of the holding sleeve 11. The soft filler 16 is not especially specified, but an elastic material such as rubbers is preferable. The elastic material such as a silicone rubber, a butadiene rubber, an isopropylene rubber, a chloroprene rubber, an isoprene rubber, an acrylate butadiene rubber, or an isobutene-isoprene rubber may be used as the soft filler 16. A silicone gel such as KE1051A and KE1051B, or KE1052A and KE1052B manufactured by Shin-Etsu Chemical Co., Ltd. may be also used. The elongation percentage of the above-described elastic materials is generally in a range of 100% to 800%. According to the embodiments of the present invention, a silicone rubber having an elongation percentage of 210% is used.

Lastly, the end faces 14a and 14b of the ferrules 8a and 8b, respectively, are mirror-polished. A fixed optical attenuator is manufactured by mounting the thus formed ferrule assembly in a housing (not shown), the ferrule assembly including an attenuating fiber.

With the soft filler 16 such as a rubber or a gel filling a space between the ferrules 8a and 8b, the attenuating fiber 9 is prevented from being damaged by mechanical impacts in virtue of the soft filler 16 absorbing the impacts, whereby an optical attenuator having excellent durability is obtainable. With regard to the optical characteristics, when a mode is changed in that a part of light is propagated along a cladding layer in a case, for example, in which the ferrules 8a and 8b are connected to another ferrule, the propagating light can be diffused and removed in a diffusion mode because of the soft filler 16 which is a soft resin such as a rubber having a high refraction index, thereby avoiding generation of noises and the like. Moreover, when the filler 16 contains a light-absorptive material such as carbon, the propagating light from the cladding layer can be absorbed and removed more effectively.

First and second embodiments, and a comparative example, and manufacturing processes, according to the present invention, are described below with reference to the drawings.

First Embodiment

Figure 2:
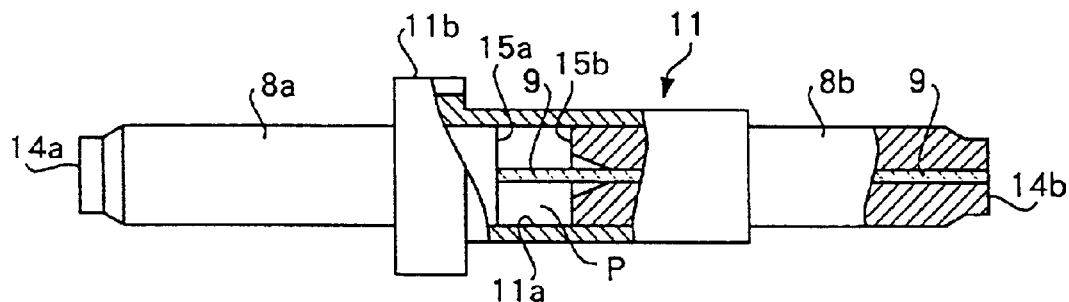
FIG. 2 is a partly sectional view of an optical attenuator according to a first embodiment of the present invention.

FIG. 2 is a partly sectional view of an optical attenuator according to the first embodiment of the present invention. In the optical attenuator according to the first embodiment, no filler is provided in a space P defined by the inner wall of the holding sleeve 11 and base ends 15a and 15b of the ferrules 8a and 8b, respectively. The opening 13 is omitted from the holding sleeve 11 of the optical attenuator according to the first embodiment.

[Manufacture of an Assembly Including Ferrules and a Holding Sleeve]

A pair of the ferrules 8a and 8b are prepared, the ferrules 8a and 8b being made of a zirconia ceramic and each having a diameter of 2 mm and a length of 10 mm. Also, the holding sleeve 11 provided with the flange 11a is prepared. The ferrules 8a and 8b are pushed into the holding sleeve 11 at the respective base ends of the ferrules 8a and 8b from the ends of the holding sleeve 11, whereby an assembly having an overall length L of 23 mm and including the ferrules 8a and 8b and the holding sleeve 11 is manufactured.

[Preparation of an Attenuating Fiber]

An attenuating fiber having a length of 30 mm, from which a coating is removed, is prepared.

[Application of an Adhesive]

A small amount of a thermosetting adhesive is applied to the end faces 14a and 14b of the ferrules 8a and 8b, respectively. Then, the ferrules 8a and 8b are heated so as to lower the viscosity of the adhesive such that the adhesive fills the central holes 10a and 10b by the effect of surface tension.

[Insertion of an Attenuating Fiber]

An attenuating fiber is inserted from the end face 14a of the ferrule 8a such that the ends of the attenuating fiber individually protrude by 3 to 4 mm from the end faces 14a and 14b, respectively.

[Curing of the Adhesive]

The ferrules 8a and 8b are heated at 100° C. for 30 minutes, thereby curing the applied adhesive.

[Polishing of the End Faces and Assembling]

The ferrules 8a and 8b are polished at the end faces thereof, and are mounted into a housing (not shown), whereby an optical attenuator is obtained.

Second Embodiment

Figure 3:
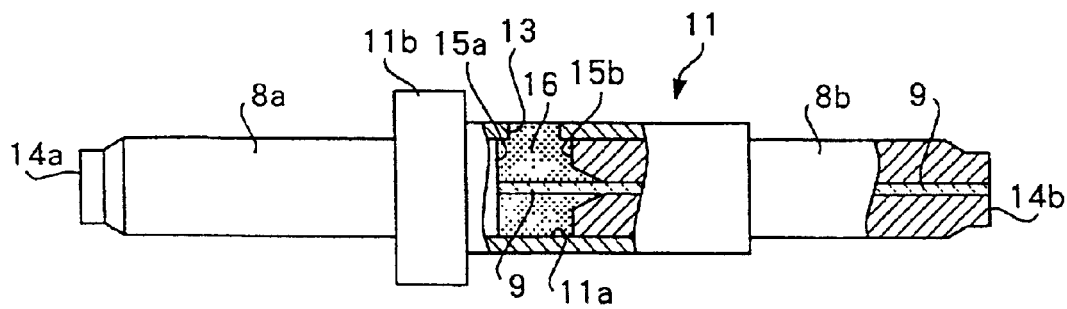
FIG. 3 is a partly sectional view of an optical attenuator according to a second embodiment of the present invention.

FIG. 3 is a partly sectional view of an optical attenuator according to a second embodiment of the present invention. In the optical attenuator according to the second embodiment, the filler 16 fills a space defined by an inner wall of the holding sleeve 11 and the base ends 15a and 15b of the ferrules 8a and 8b, respectively. The distance between the base ends 15a and 15b is 3 mm.

The optical attenuator according to the second embodiment is manufactured in the same manner as that according to the first embodiment from the process for preparing the ferrules 8a and 8b and the holding sleeve 11 to the process for curing the adhesive. The following process is added, according to the second embodiment, after the process for curing the adhesive and before the processes for polishing the end faces and for assembly.

[Application and Curing of an Elastic Material and the Like]

Thermosetting silicone is applied by an amount of 0.02 ml through the opening 13 of the holding sleeve 11 by using a dispenser and is cured by being heated at 120° C. for 60 minutes.

COMPARATIVE EXAMPLE

Figure 4:
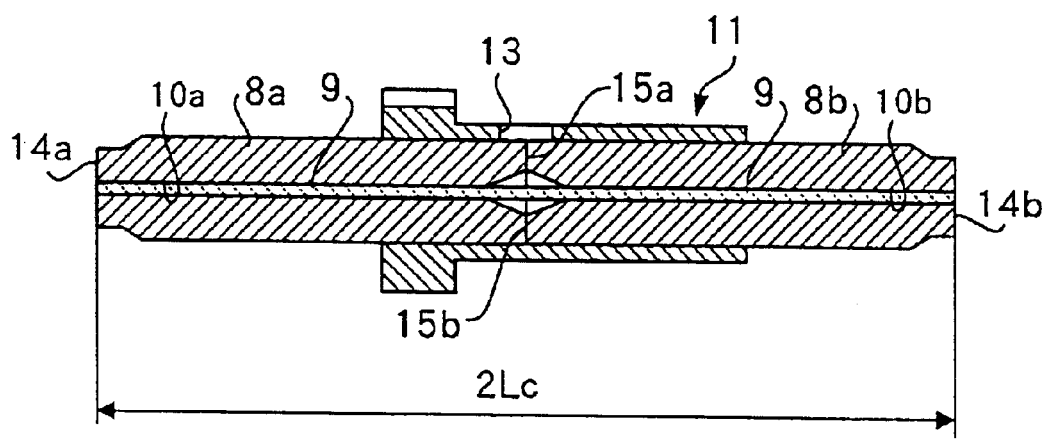
FIG. 4 is a sectional view of a comparative example of the optical attenuator according to the embodiments of the present invention.
Figure 6:
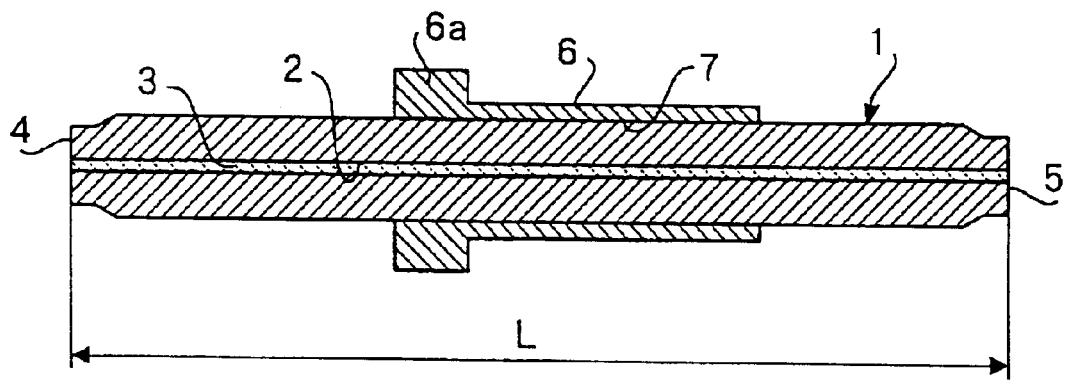
FIG. 6 is a sectional view of a known typical optical attenuator.

FIG. 4 is a sectional view of a comparative example of an optical attenuator. In the comparative example, the ferrules 8a and 8b are in contact with each other at the base ends 15a and 15b thereof. Components and manufacturing processes are the same as those of the optical attenuator according to the above-described embodiments, for which description is omitted.

Twenty samples of the optical attenuator according to each of the first and second embodiments and the comparative example were prepared, and an evaluation test on the various characteristics of the optical attenuator according to the present invention was performed by using these samples in accordance with GR-910-CORE of the Telcordia (previously Bellcore) standards. The result of the test is shown in FIG. 5, in which the characteristic for which the twenty samples satisfied the criterion is marked with "A", the characteristic for which one or two of the twenty samples did not satisfy the criterion is marked with "B", and the characteristic for which three or more samples did not satisfy the criterion is marked with "C". It has been known from the result of the test that the comparative example cannot be used in an ordinary state, in which all the twenty samples each having no space between the ferrules 8a and 8b did not satisfy the criterion of the fall down test and two of the twenty samples did not satisfy the criterion of the vibration test.

In contrast, concerning the optical attenuator which is provided with a space between the base ends of the ferrules 8a and 8b, two samples of the optical attenuator according to the first embodiment did not satisfy the criterion of the fall down test according to the Telcordia standards, the optical attenuator according to the first embodiment being provided with the space but not provided with a filler in the space. However, it has been known that the optical attenuator according to the first embodiment can be used in an ordinary state without serious problems. It has been known that the optical attenuator according to the second embodiment satisfies all the criteria set for the characteristics according to the standards, and the characteristics the same as those of the known optical attenuator using one ferrule can be obtained.

The optical attenuator according to the present invention uses two ferrules each having smaller length than that of the attenuating fiber. The two ferrules are positioned such that a space is formed between the ferrules opposing each other at the base ends thereof. A relatively soft resin is applied to the space, as needed. Therefore, an optical-attenuation-ferrule assembly having the same or substantially the same mechanical characteristics as those of the optical attenuator using one longer ferrule is obtainable. Since the resin disposed between the base ends of the ferrules 8a and 8b has a refraction index higher than that of the cladding of the attenuating fiber 9, a part of light which is propagated along a cladding layer when the ferrules 8a and 8b of the optical attenuator are connected to another ferrule and which generates a cladding mode causing noises can be diffused in a diffusion mode. Moreover, when the filler 16 contains a light-absorptive material such as carbon, the cladding mode can be absorbed and removed more effectively.

By controlling the distance, that is, the length of the attenuating fiber between the base ends of the ferrules 8a and 8b, the attenuation can be finely controlled, whereby desired attenuation can be obtained highly accurately. Since the optical attenuator according to the present invention has excellent optical characteristics and can be manufactured by using relatively short ferrules which have reliable quality, the optical attenuator according to the present invention can be easily manufactured in large quantities although the mass production of attenuating fibers has been difficult. Although according to the first and second embodiments, the distance between the base ends of the ferrules 8a and 8b of the optical attenuator is set to 3 mm, slight variation in the distance does not significantly affect the performance of the optical attenuator.

What is claimed is:

1. An optical attenuator comprising:
   a holding sleeve;
   a pair of ferrules inserted into and fixed to the holding sleeve such that the ferrules oppose each other at base ends thereof at a predetermined distance between each base end; and
   an attenuating fiber inserted into and fixed to the pair of ferrules such that ends of the attenuating fiber are exposed.

2. An optical attenuator according to claim 1, wherein a soft resin is provided in a space between the base ends of the ferrules.

3. An optical attenuator according to claim 2, wherein the soft resin comprises an elastic material including rubber or gel.

4. An optical attenuator according to claim 2, wherein the soft resin comprises a filler containing a light-absorptive material.

* * * * *